United States Patent [19]

Katayama

[11] 4,346,451

[45] Aug. 24, 1982

[54] DUAL MODULI EXPONENT TRANSFORM TYPE HIGH SPEED MULTIPLICATION SYSTEM

[76] Inventor: Aisuke Katayama, 2-47, Kawamotomutsumicho, Akita-shi, Akita, Japan

[21] Appl. No.: 152,681

[22] Filed: May 23, 1980

[30] Foreign Application Priority Data

Jun. 1, 1979 [JP] Japan .................................. 54-67495

[51] Int. Cl.³ .............................................. G06F 7/52
[52] U.S. Cl. ................................................... 364/746
[58] Field of Search .......................................... 364/746

[56] References Cited

U.S. PATENT DOCUMENTS

| 3,167,645 | 1/1965 | Hoffmann et al. | 364/746 |
| 4,064,400 | 12/1977 | Akushsky et al. | 364/746 |
| 4,107,783 | 8/1978 | Huang | 364/746 |

OTHER PUBLICATIONS

Soderstrand et al., "A High-Speed Low-Cost Modulo Pi Multiplier with RNS Arithmetic Applications", Proceedings of the IEEE, vol. 68, No. 4, Apr. 1980, pp. 529-532.

Primary Examiner—David H. Malzahn
Attorney, Agent, or Firm—Laff, Whitesel, Conte & Saret

[57] ABSTRACT

For calculating a product of a first and a second integer, each given by even digits, a multiplier comprises a first unit for calculating a first residue congruent to the product modulo a prime number by the use of one-to-one correspondence of each integer to an exponent of a primitive root of the prime number, a second unit for calculating a second residue congruent to the product modulo an even number equal to the prime number less one, and a third unit for processing the first and the second residues to a processed result. A higher and a lower half of digits of the product are given by the processed result and the second residue. Each integer may be given on the basis of a predetermined radix, such as 10 or 2, by h digits with the prime number given by an h-th power of the radix plus one. Preferably, the second residue is calculated by multiplying a higher and a lower half of the digits of the first integer by a higher and a lower half of the second integer and by combining the product in a predetermined manner.

8 Claims, 6 Drawing Figures

DUAL MODULI EXPONENT TRANSFORM TYPE HIGH SPEED MULTIPLICATION SYSTEM

BACKGROUND OF THE INVENTION

This invention relates to a multiplication system which may be used in, among others, an electronic digital computer.

In most of conventional multiplication systems or multipliers, multiplication is successively carried out under control of a sequence of clock pulses. The multipliers are slow because a multiplicity of calculation steps should be successively processed in consideration of the number of times that a digit is carried during the progress of the multiplication. In other words, the multiplication speed is dependent on the number of calculation steps and a clock rate of the clock pulse sequence. Attempts have mainly been directed to a reduction of the number of calculation steps and to an increase of the clock rate.

Alternatively, a conventional multiplier utilizes a logarithmic transform. This reduces the number of calculation steps and raises the speed of multiplication. However, a round-off error has been inevitable because most logarithms cannot be represented by integers. Even with a bulky and intricate multiplier, it has been difficult to reduce the round-off error.

SUMMARY OF THE INVENTION

It is, therefore, an object of this invention to provide a multiplication system which operates at a high speed without any round-off error.

It is another object of this invention to provide a multiplication system of the type described, which has a simple structure.

According to this invention, a system is provided for multiplying two integers of even digits (denoted by h digits) within the prescribed radix integer field. Multiplication is by means of a two stage processes, first, computing simultaneously (1) an integer of h digits called a first product residue modulo, the prescribed prime integer being one more than an h-th powered radix, and (2) another integer of h digits called a second product residue modulo, being the h-th powered radix from two integers. Second, the multiplication combines the first and second product residues into the higher h-digit portion of a product. The second product residue is already obtained in the first stage, giving the lower h-digit portion of the product; therefore, at the end of the second stage, the product is completely separate.

The system according to this invention is a combination of three means and comprises first means for generating the first product residue responsive to the two integers. Each of the two integers is converted to an exponent of the prescribed primitive root, inherent to the prime modulus integer respectively. Next, a sum exponent of the two exponents is obtained by an addition modulo of the h-th powered radix. Finally, the sum exponent is converted to an h digits integer equal to the first product residue; therefore, the first means is constructed by the unilateral combination of exponent transform ROM's, a modulus adder, and an inverse exponent transform ROM. A second means generates a second product residue responsive to two integers, first, by partitioning the two integers into respective higher and lower halved digits integers, and by multiplying the halved integers with each other, both of them being higher halved integers. Then, three partial products are generated. Second, these partial products are applied to two adders modulo, the half of the h-th powered radix, a sum the modulo being provided, giving the most significant digits portion of the second product residue, and lower digits of a partial product of both lower halved integers giving directly the least significant digits portion of the second product residue. Therefore, the second means is composed of smaller digit multipliers and two adders modulo, the half of the h-th powered radix. A third means combines first and second product residues into the most significant h digits portion of the product. The third means comprises two complementors and adders modulo, the h-th powered radix.

DESCRIPTION OF THE PREFERRED EMBODOIMENTS

Figure 1:
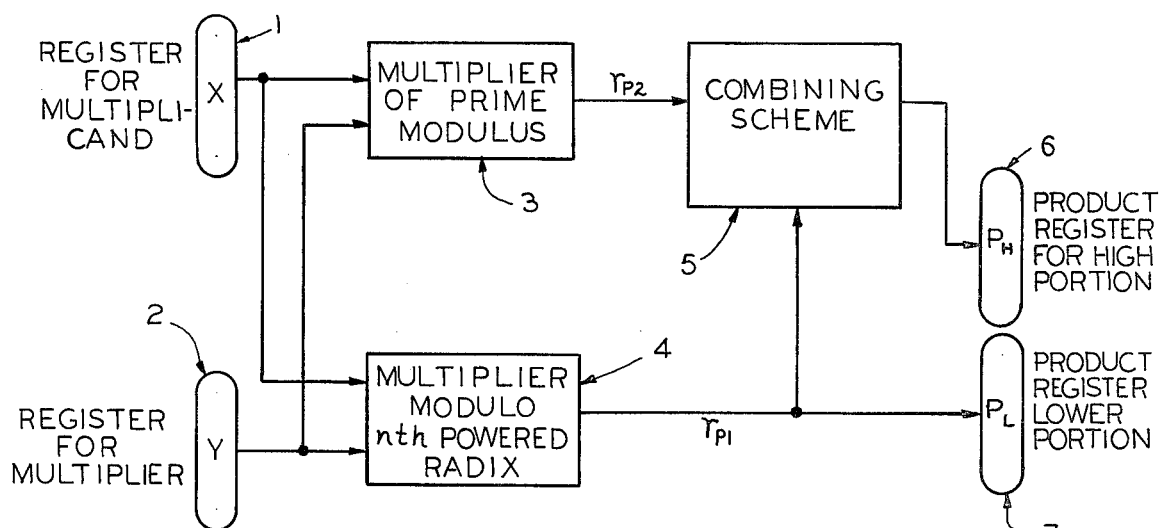
FIG. 1 is a block diagram of a multiplication system according to a preferred embodiment of this invention.

In the preferred embodiments of the inventions, the basic concepts derived from the number theory are necessary to embody and implement the inventions. Thus, a short account of the number theory is given first.

Except where specially mentioned, all numbers are positive integers, in this specification. Then, among a, b, k, and m, the following equation holds:

$$a = b + k \times m \quad (k = 0, 1, 2, \ldots) \tag{1}$$

For a prefixed number m, a is in a congruent relationship to b, with the modulus m. The relationship is written as follows:

$$a \equiv b \pmod{m} \tag{2}$$

The modulus m is a crucial number in the number systems. The inventive hardware systems in digital processing are backgrounded in these relationships.

In the relationship (2), b is called a residue of a with the modulus m. It should be mentioned that b is an integer which is less than m, and which excludes 0 in the number theory. However, in the embodiments of the inventions, b is included as the specific number, in the case required.

For instance; $9 \equiv 2 \pmod{7}$, $15 \equiv 1 \pmod{7}$.

For the prefixed modulus m, there exists a set composed of all residues such as $(1, 2, 3, 4, \ldots, m-1)$. This set is called the residue class (for the modulus m), and is denoted as Z.

For example, when $M = 4$, $Z = (1, 2, 3)$.

A residue class that deletes the numbers not coprime with the modulus is called a "reduced residue" class.

A reduced residue class is denoted as R. In the previous example, $R = (1, 3)$; therefore, R is not equal to Z.

In general, if the modulus is prime, then the reduced residue class is equal to the residue class. Otherwise, if the modulus is not prime, the residues differ.

The Euler function $P(m)$ is equal to the number of integers in the reduced residue class, that is, the number of integers that are coprime to the modulus. Thus, if the modulus m is prime, the Euler function $P(m)$ indicates the total number of integers which are less than m, that is, $P(m) = m - 1$.

The Fermat number F is denoted by $F = 2^h + 1$, $h = 2^k$, and it is known that the Fermat number is prime for $k = 4$.

For $k = 3$, $h = 8$ and the Fermat number is $2^8 + 1 = 257$. In this case, the residue class is equal to the reduced residue class and it is shown as follows:

$$Z = R = (b) = (1, 2, 3, \ldots, 255, 256); \text{ modulus } m = 257$$

If we shift right by one element and add 0 as the leftmost element, then the modified reduced residue may be obtained as follows:

$$R' = (0, 1, 2, 3, \ldots, 254, 255) \quad (3)$$

This modified residue class is very important because all integers in the class are represented the binary numbers of 8-bit length, when translated into their binary form.

A number system may be defined mathematically in terms of the polynomial:

$$N = a_n q^n + a_{n-1} q^{n-1} + \ldots + a_1 q^1 + a_0 q^0 \quad (4)$$

where N is a positive integer, q a positive integer radix, and $a_i$ represents the symbols.

In the modular arithmetic, if N is represented by $a_n a_{n-1} \ldots a_0$ and is expressed by the residue r and if the modulus is $q^h$, where h is less than n, then the following equation holds:

$$N = r + k \times q^h \quad (k \geq 10) \quad (5)$$

where $$r = a_{h-1} a_{h-2} \ldots a_1 a_0 = a_{h-1} \times q^{h-1} + \ldots + a_0 \times q^0 \quad (6)$$

It should be mentioned that the residue r, with the modulus $q^h$ is representing the lower h-digit portion of N, denoted by $L_h(N)$. Also, from the above formula (2), the following congruent relation holds:

$$N \equiv r \pmod{q^h}, \quad r = L_h(N) = a_{h-1} \times q^{h-1} + \ldots + a_0 \times q^0 \quad (7)$$

The above mentioned matter can be understood easily by the examples of the decimal system wherein the moduli are selected from the radix $10^h$, as shown:

$$N = 75634, \quad N \equiv 634 \pmod{10^3}, \quad r = 634$$
$$N \equiv 34 \pmod{10^2}, \quad r = 34$$
$$N \equiv 4 \pmod{10}, \quad r = 4$$

Similarly, in the binary system, the radix is 2 and a number $N = b_n b_{n-1} \ldots b_h \ldots b_0$ is given. Then, if the modulus is selected as $2^h$, where h is less than n, then N and the residue r are in congruent relation as follows:

$$N \equiv r \pmod{2^h}; \quad r = b_{h-1} b_{h-2} \ldots b_0 = L_h(N) \quad (8)$$

Therefore, if N is a binary number larger than an 8-bit number, and if the modulus is $2^8$, then from formula (7), the residue r is the lower 8-bit portion of N, representing an 8-bit number in the residue class of $2^8$. In the decimal form, r may take any value 0, 1, 2, 3, ..., 255, either odd or even. However, it should be mentioned that in the embodiment of the invention in the binary system, the residue r must take the form of the binary number of 8-bit length, for instance, $1_{(10)} = 00000001_{(2)}$.

As previously mentioned, the Euler function $P(m)$ is equal to the total number of the residues which are co-prime to the modulus m.

When the modulus m is prime, $P(m)$ is $m - 1$, and this gives the total number of residues in the residue class of the modulus m, because the reduced residue class is equal to the residue class.

There are several primitive roots which are inherent to the prime modulus, and one of them is denoted by g. Then the following important relation holds:

$$g^{P(m)} \equiv 1 \pmod{m} \quad (9)$$

where m is prime, $P(m)$ is $m - 1$.

If $\alpha$ is a positive integer less than $P(m)$, then there is a corresponding residue a, such that the following relation holds:

$$g^\alpha \equiv a \pmod{m} \quad (10)$$

wherein $\alpha$ is called an exponent, and a is the corresponding residue concerning the prescribed prime modulus m and primitive root. Therefore, one by one, there is a transform that a residue converts to an integer exponent, and vice versa.

The transform for converting a residue to an exponent is called an "exponent transform," and the transform for converting an exponent to a residue is called an "inverse exponent transform."

In these transforms, the number of corresponding elements is equal to $m - 1$, where the modulus is m, and the prescribed primitive root specifies these elements.

The correspondence between the exponent residue class E and the residue class R is illustrated symbolically as follows:

$$E = (0, 1, \ldots \alpha, \beta, \ldots, m-2) \rightleftharpoons (1, g, \ldots, a, b, \ldots, j) = R$$

Let $\beta$ be an exponent other than $\alpha$; then, it corresponds to a residue b which is other than a. Therefore, $$g^\beta \equiv b \pmod{m} \quad (11)$$

From the multiplication rule of the congruent relations, $$g^\alpha \times g^\beta \equiv a \times b \pmod{m} \quad (12)$$

While $\alpha + \beta$ and $a \times b$ are within their respective residue classes, the following relation holds:

$$g^{\alpha + \beta} \equiv a \times b \pmod{m} \quad (13)$$

This fact that the multiplication of residues corresponds to an addition of the exponents is a basic idea of one part of the invention. However, the above relation only holds within a limited range. Let $S_r$ be an exponent sum residue with the modulus $P(m)$, and $r_p$ be a product residue with the prime or composite prime modulus m; then $$\alpha + \beta \equiv S_r \pmod{P(m)} \quad (14)$$

$$a \times b \equiv r_p \pmod{m} \tag{15}$$

Therefore, the general relation holds as follows:

$$g^S r \equiv r_p \pmod{m} \tag{16}$$

It should be mentioned that, if the modulus m is pure prime, the Euler function P(m) is equal to m−1, and there is a one to one correspondence between an exponent and a residue which may be either odd or even, because the number of these elements is equal to m−1 respectively.

Therefore, by using only the exponent transform type systems, the multiplication system for every integer must be governed by the prime moduli only. However, it is impossible in the dual moduli system for multiplication to be carried out where one of the moduli is not prime.

The dual moduli multiplication system based on the number theory is explained in the following specification. Such a system operates for every integer without a compensating scheme, and it is the preferred embodiment of the invention.

The basic relationship will next be explained in detail.

In the invention, the binary multiplication system is the main concern. Therefore, its theory is developed in the binary system first.

Let X and Y be every integer that is being multiplied, both in h-bit length. If a real product XY is congruently related to the product residue $r_{p1}$ with the modulus $2^h$, and to the product residue $r_{p2}$ with the modulus $2^h+1$ that is prime. Then the following relationship hold:

$$XY \equiv r_{p1} \pmod{2^h} \tag{17}$$

$$XY \equiv r_{p2} \pmod{2^h+1} \tag{18}$$

These relations are equivalent to:

$$XY = A(2^h) + r_{p1} \tag{19}$$

$$XY = B(2^h+1) + r_{p2} \tag{20}$$

where A and B are quotients of XY divided by the respective moduli.

Since the product XY is of a 2h-bit length and is less than $2^{2h}$ in value, B is less than $2^h$ from (20), and less than A; therefore, A−B is a positive integer.

From (19), (20) we have:

$$A2^h + r_{p1} = B2^h + B + r_{p2} \tag{21}$$

Hence, $$B = r_{p1} - r_{p2} + (A-B)2^h \tag{22}$$

Therefore, $$B \equiv r_{p1} - r_{p2} \pmod{2^h} \tag{23}$$

Since B is a positive integer and less than $2^h$ in value, the following equation holds:

$$B = r_{p1} - r_{p2} \pmod{2^h} \tag{24}$$

Therefore, upon substituting the above equation (24) into equation (20), $$XY = (r_{p1} - r_{p2} \pmod{2^h})2^h + (r_{p1} - r_{p2} \pmod{2h}) + r_{p2} \tag{25}$$

This basic equation shows that the correct 2h-bit product can be obtained from the product residue $r_{p1}$ with the modulus $2^h$ and from the product residue $r_{p2}$ with the modulus $2^h+1$.

From the mathematical viewpoint, the equations (24), (25) are unusual, but it is very convenient to implement the digital system if the embodiments of the invention comprises:

In usual sense, equation (24) is equivalent to:

If $r_{p1} > r_{p2}$, then $B = r_{p1} - r_{p2}$ (26)

If $r_{p1} < r_{p2}$, then $B = r_{p1} - r_{p2} + 2^h$ (27)

These relations show that when $r_{p1}$ is less than $r_{p2}$, there is a $2^h$ generation which can be represented as 100000000 in binary form in the case of h=8, and that $r_{p1}$, $r_{p2}$ are always h-bit numbers, and $2^h$ has only 0 bits in its lower h-bit portion.

Therefore, the lower h-bit portion of the 2h-bit product can be obtained from equations (25), (26), (27). This bit portion is denoted as $L_h(XY)$, and may be shown as:

$$L_h(XY) = r_{p1} - r_{p2} + r_{p2} = r_{p1}$$

That is:

$$r_{p1} = L_h(XY) \tag{28}$$

It is clear that $r_{p1}$ is the product residue of the correct product with the modulus $2^h$. The modulus $2^h$ is an h-th power of the radix 2 of the binary system. This fact is conformed to the congruent relation (8), which was previously derived.

And therefore, it becomes clear that the basic relationship (25) is needed only for obtaining the higher h-bit portion $H_h(XY)$ of the real 2h bit product XY.

In the right-hand side of the basic equation (25), the first term constitutes the higher h-bit portion of the product, to which is added 1 in the LSB position, if carry-out occurs from the other terms, as equation (27) indicated. This carry bit addition to the higher h-bit portion of the real product is performed automatically by the digital system constructed according to the basic relationship (25). This is one portion of the preferred embodiment of the invention.

Formal representation is given as follows:

If $r_{p1} > r_{p2}$: $H_h(XY) = r_{p1} - r_{p2} \pmod{2^h}$ (29)

If $r_{p1} < r_{p2}$: $H_h(XY) = r_{p1} - r_{p2} \pmod{2^h} + 1$ (30)

It should be mentioned that the operation for obtaining $H_h(XY)$ is performed automatically, and required only h-bit adders and a complementor.

The dual moduli multiplication system, for multiplying binary integers of an h-bit length, is thus constructed by the parallel connection of the subsystem of the modulus $2^h$ for performing the multiplication and for obtaining the lower h-bit portion of the 2h-bit correct product. This h-bit portion is also equal to the product residue of h-bit length with the modulus $2^h$. The subsystem of the modulus $2^h+1$ must be prime. The exponent transform multiplication is used for obtaining the h-bit product residue with the prime modulus $2^h+1$. The subsystem may be used for combining residues of different moduli to obtain the higher h-bit portion of the final product on the h-bit adder.

This multiplication system operates for every integer of h-bit length which is being multiplied. No compensating means are required, and there are no round-off errors. In the asynchronous mode, a timing clock is not required.

The final product is obtained, almost concurrently, in the separate higher and lower portions. This assures a multiplication which is faster than the usual fast array type multiplier which requires the clock and many adders stages, especially the final 2h-bit adder in which a carry propagation delay decreases the speed, even with the accommodation of the complex carry-look-ahead circuitry.

Although explained about the dual moduli multiplication system on the binary system, the same principles can be extended to multiplication systems on other number system, and can be embodied as the digital scheme if the number can be expressed in the binary form.

Therefore, the basic structure of the embodiments of the invention may be described by more general terms.

In general, if the following congruent relations hold:

$$a \equiv a' \pmod{m} \tag{31}$$

$$b \equiv b' \pmod{m} \tag{32}$$

for the same modulus m, then $$a \times b \equiv a' \times b' \pmod{m} \tag{33}$$

Since all numbers in this specification are positive integers, there is a number $r_p$ satisfying the congruent relation (33) as follows:

$$a \times b \equiv r_p \pmod{m} \tag{34}$$

The term $r_p$ is called a "product residue" with the modulus m, or more simply, a product residue modulo m. It should be mentioned that there is only one product residue $r_p$ for a product $a \times b$, and there is a relationship between them.

On the other hand, the number system treated in the multiplication system is represented by the sum of the powered radix sequence with symbols as shown in equation (4).

In the dual moduli multiplication system, the numbers being multipled are assumed to be in the prefixed radix number system, and of the prefixed digit length, which is assumed as h-digit.

Therefore, a correct product must be of a 2h-digit length.

Let X and Y be the numbers of h-digit length which are being multiplied, and be in the prescribed radix q number system.

In the dual moduli multiplication system, multiplication operations are performed concurrently, by applying X and Y in parallel to the respective multiplicand and multiplier terminals of the respective multiplication subsystems with the respective moduli. One of the moduli must be equal to $q^h$, and another one must be a prime number $1+q^h$.

Then, the respective product residues $r_{p1}$, $r_{p2}$ of h-digit length are generated on the respective subsystem outputs.

These product residues can be written as follows:

$$XY \equiv r_{p1} \pmod{q^h} \tag{35}$$

$$XY \equiv r_{p2} \pmod{q^h+1} \tag{36}$$

From equation (7), a product residue $r_{p1}$ provides the lower h-digit portion of the correct product XY.

The similar relation among XY, $r_{p1}$ and $r_{p2}$ holds also for the moduli $q^h$, $q^h+1$ system as follows:

$$XY = (r_{p1} - r_{p2} \pmod{q^h}) q^h + (r_{p1} - r_{p2} \pmod{q^h}) + r_{p2} \tag{37}$$

According to this relationship, the subsystem is constructed to combines residues $r_{p1}$ and $r_{p2}$ into the higher h-digit portion of a correct product, which appears on the sum terminal of the final h-digit adder constituting the last subsystem.

FIG. 1 shows a block diagram of the dual moduli multiplier which is the embodiment of the inventions. More particularly, the registers 1 and 2 set a multiplicand and a multiplier of the specified digit length, respectively.

The subsystems 3 and 4 contain the respective moduli $q^h+1$, $q^h$ performing respective multiplications and generating respective product residues. The product residue gives the lower portion of a correct product, which is applied to an output register 7 that supplies the lower portion of a correct product. Circuit 5 combines the two product residues obtained from subsystems 3 and 4, generating the higher portion of a correct product, which is placed in the register 6. The registers 6 and 7 separately contain the higher and lower digit portion of a correct product.

DETAILED DESCRIPTION OF THE BINARY MULTIPLICATION SYSTEM USING THE DUAL MODULI SYSTEMS

The binary number system has the radix 2. Binary integers are multiplied by h-bit length values and are assumed to apply to the dual moduli multiplication system. Then, the moduli must be such that one is the h-th powered radix $2^h$, and another one is the prime number $2^h+1$. Therefore, the bit length of integers applied to the system is restricted to the case of h=4, 8, 16.

Fortunately, 8 bits by an 8 bits multiplier can be constructed by the above means and assure a multiplication which is faster than the conventional multiplication which operates on the mode of shift and add sequence. Therefore, the following description explains the dual moduli multiplier for which h is equal to 8. However, by a slight modification, this multiplier can be extended to the case of h=16.

In general, using the byte multiplier as the basic module, to perform the longer bit-length multiplication is a usual and widely known method which appears in many computer manuals.

THE OPERATION AND STRUCTURE OF THE PRIME MODULUS MULTIPLICATION SYSTEM

This system uses a multiplicand X and a multiplier Y which performs the multiplication and generates a product residue $r_{p2}$ with the modulus $2^h+1$, which is prime. Because the numbers being multiplied are of h-bit length, they can be considered as residues with the prime modulus.

By the exponent transform relation (10), we can find an exponent x for X, which is considered as a residue. This transformation is performed by an exponent transform ROM, that is constructed by depositing an exponent on the address location specified by a corresponding residue. This construction is implemented according to Table 1. Table 1 shows the correspondence between residues and exponents, wherein the prime modulus is $257(2^h+1; h=8)$, and the prescribed primitive root g inherent to the modulus is 10. For instance, if an exponent is 1, then a respective residue is 10, because $g^1=10^1=10\equiv 10(\mod 257)$.

Therefore, for every multiplicand of h-bit length, there is a corresponding exponent which is provided on the output data bus of the exponent transform ROM which is being activated. This exponent x is applied to the augend terminal of an adder with the modulus $2^h$.

The same exponent transform ROM is also provided for a multiplier. When a multiplier Y is applied as an address of the ROM, there is a corresponding exponent y which is fed to the addend terminal of the adder modulo $2^h$.

Then, the h-bit adder performs the modulus addition automatically and provides a sum exponent $S_p$ modulo $2^h$ on the sum terminal. Following the teaching of equation (14), the formal relationship is given as follows:

$$x+y\equiv S_p(\mod 2^h). \tag{38}$$

Finally, when this sum exponent $S_p$ is applied as an address to an inverse transform ROM, a product residue with the prime modulus $r_{p2}$ is generated on the output bus of the inverse exponent transform ROM. The inverse exponent transform ROM is constructed by depositing a residue on an address specified by a respective exponent. This corresponding relationship is shown in Table 2.

The formal representation of an inverse transform which occurs here is shown as follows:

$$g^{S_p}\equiv r_{p2}(\mod 2^h 30\ 1). \tag{39}$$

Further, the said product residue modulo, the prescribed prime number, can only be computed quickly by the exponent transform method of multiplication. Therefore, the multiplication subsystem for generating the product residue $r_{p2}$ by means of an exponent transform constitutes one of the preferred embodiments of the invention.

Figure 2:
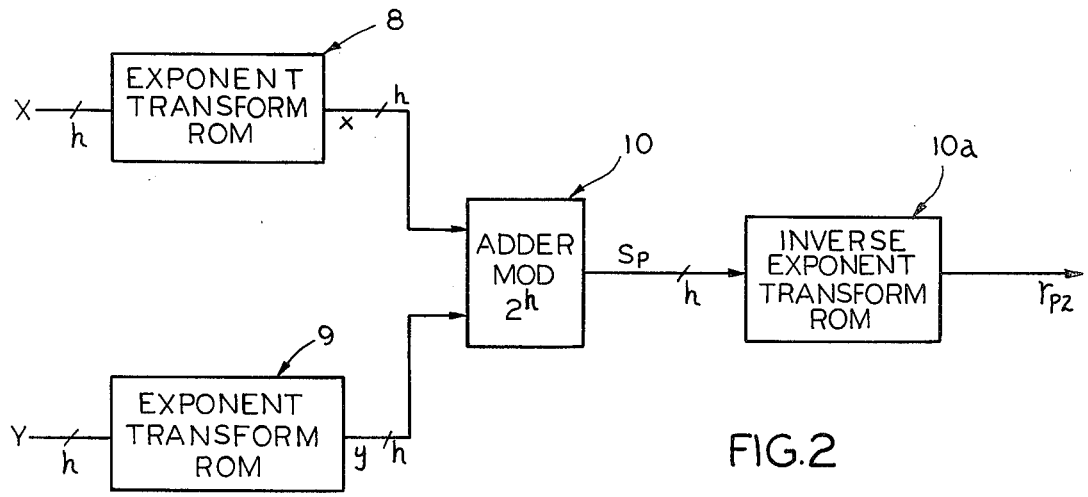
FIG. 2 is a block diagram of a first subsystem for use in a first embodiment illustrated in FIG. 1.

The system mentioned in the foregoing paragraph is represented by block 3 in FIG. 1. The structure of block 3 is shown in FIG. 2, where each of the exponent transform ROM's 8 and 9 has bit-size $2^h\times h$.

The h-bit adder for a modulus addition is indicated by block 10, and the inverse exponent transform ROM of bit size $2^h\times h$ is indicated by block 10a.

An example will clarify the computation implemented in the system: MULTIPLY 234 AND 175. From Table 1;

$X=234; x=4, Y=175; y=69, x+y=73(\mod 256)(2^h;$
$h=8), S_p=73.$ From Table 2; $r_{p2}=87.$ Note that $r_{p2}$ differs from the product of 234 and 175. However, residue $r_{p2}$ can be used to determine the higher bit portion of the product.

THE OPERATION AND STRUCTURE OF THE POWERED RADIX MODULUS MULTIPLICATION SYSTEM:

In this binary multiplication system, where the radix is 2, and the numbers being multiplied are of h-bit length, the prescribed modulus of the system is given by the h-th powered radix $2^h$.

When a multiplicand X and a multiplier Y are applied, the system computes a product residue $r_{p1}$ in the relationship as follows: $XY=r_{p1}(\mod 2^h)$. From equation (28), it is evident that $r_{p1}$ is equal to the lower h-bit portion of the product XY.

In this explanation, h is equal to 8, and 8 bits number forms a byte. The byte is the basic unit of binary numbers, and half of a byte is sometimes known as a nibble. In the following, a 4 bits number is called a nibble. Integers X, Y are bytes, and can be expressed by respective nibbles as follows:

$$X=X_1X_0 \tag{40}$$

$$Y=Y_1Y_0 \tag{41}$$

and also expressed by radix polynominals as follows:

$$X=X_12^4+X_0 \tag{42}$$

$$Y=Y_12^4+Y_0 \tag{43}$$

A nibble is a 4 bits number; therefore, it is represented by hexadecimal symbols of 0, 1, 2, . . . , 9, A, B, C, D, E, F.

From (42), (43), the product XY can be written as:

$$XY=X_1Y_12^8+(X_1Y_0+X_0Y_1)2^4+X_0Y_0 \tag{44}$$

Since residue is the lower h-bit portion of the product XY residue, $r_{p1}$ is also a byte for $h+8$, and is divided into nibbles as $$r_{p1}+r_{p1H}r_{p1L}=r_{p1H}2^4+r_{p1L} \tag{45}$$

The nibble products in the equation (44) denoted below are bytes, so that they are also divided into respective nibbles as follows:

$P_0=X_0Y_0=P_{0H}P_{0L}=P_{0H}2^4+P_{0L}$ $P_1=X_0Y_1=P_{1H}P_{1L}=P_{1H}2^8+P_{1L}2^4$ $P_2=X_1Y_0=P_{2H}P_{2L}=P_{2H}2^8+P_{2L}2^4 \tag{46}$ Substituting these equations into equation (44), the following equation is obtained as:

$$XY = X_1Y_12^8 + (P_{1H}P_{1L} + P_{2H}P_{2L})2^4 + P_{0H}P_{0L} \tag{47}$$
$$= (X_1Y_1 + P_{1H} + P_{2H})2^8 + (P_{2L} + P_{1L} + P_{0H})2^4 + P_{0L}$$

Because the basic operation of the present system is to obtain the lower h-bit portion of the product, it is apparent that residue $r_{p1}$ is given by the second and third terms on the right-hand side of equation (47). Residue $r_{p1H}$ is obtained by the sum modulo $2^4$ of $P_{1L}+P_{2L}+P_{0H}$, and residue $r_{p1L}$ is $P_{0L}$ itself. The reason why the sum modulo $2^4$ operation is required, is to enable a neglecting of the overflow carry bit in the summation.

Therefore, obtaining:

$$r_{p1L}=P_{0L} \tag{48}$$

$$r_{p1H}=P_{1L}+P_{2L}+P_{0H}(\mod 2^4) \tag{49}$$

Consequently, the system is composed of three small multipliers that, when applied $X_0, Y_0; X_0, Y_1; X_1, Y_0;$ as the two respective numbers that are being multiplied are able to generate the respective products: $P_0(P_{0H}P_{0L})$, $P_{1L}$, $P_{2L}$. Two adders, according to equation (49), perform an addition modulo $2^4$ of $P_{0H}$, $P_{1L}$, $P_{2L}$, thereby obtaining a residue $r_{p1H}$ on the sum terminal of the second adder.

In general, the numbers being multiplied X, Y of h-bit length are partitioned to the half bit length numbers such as:

$$X = X_1 X_0 \tag{50}$$

$$Y = Y_1 Y_0 \tag{51}$$

Then, the same relationship hold as follows:

$$P_0 = X_0 Y_0 = P_{0H} P_{0L} = P_{0H} 2^{h/2} + P_{0L}$$

$$P_1 = X_0 Y_1 = P_{1H} P_{1L} = P_{1H} 2^h + P_{1L} 2^{h/2}$$

$$P_2 = X_1 Y_0 = P_{2H} P_{2L} = P_{2H} 2^h + P_{2L} 2^{h/2} \tag{52}$$

And the equation similar to equation (47) holds, so that the following relation results:

$$r_{p1L} = P_{0L} \tag{53}$$

$$r_{p1H} = P_{1L} + P_{0H} (\bmod \ 2^{h/2}). \tag{54}$$

Consequently, the system for multiplying integers X, Y of h-bit length, obtain the lower h-bit portion of the product which is equal to the product residue $r_{p1}$ modulo h-th powered radix of the prescribed binary number system. The system comprises three multipliers which compute the respective three products of two integers which are equal to the partitioned halves of the integers X, Y, and are other than the two integers both of higher halves. The two adders modulo the half of the prescribed modulus that perform additions modulo of the three products, thereby generating the higher portion of residue $r_{p1}$. The lower portion of residue of $r_{p1}$ is obtained on the lower half bit portion of the product for integers both lower halves of the integers X, Y being multiplied. This system is shown in FIG. 3.

Therefore, the system modulo h-th powered radix of the binary number system, when applied integers of h-bit length being multiplied, provides said product residue $r_{p1}$ which is used to get the higher portion of said product also.

Figure 3:
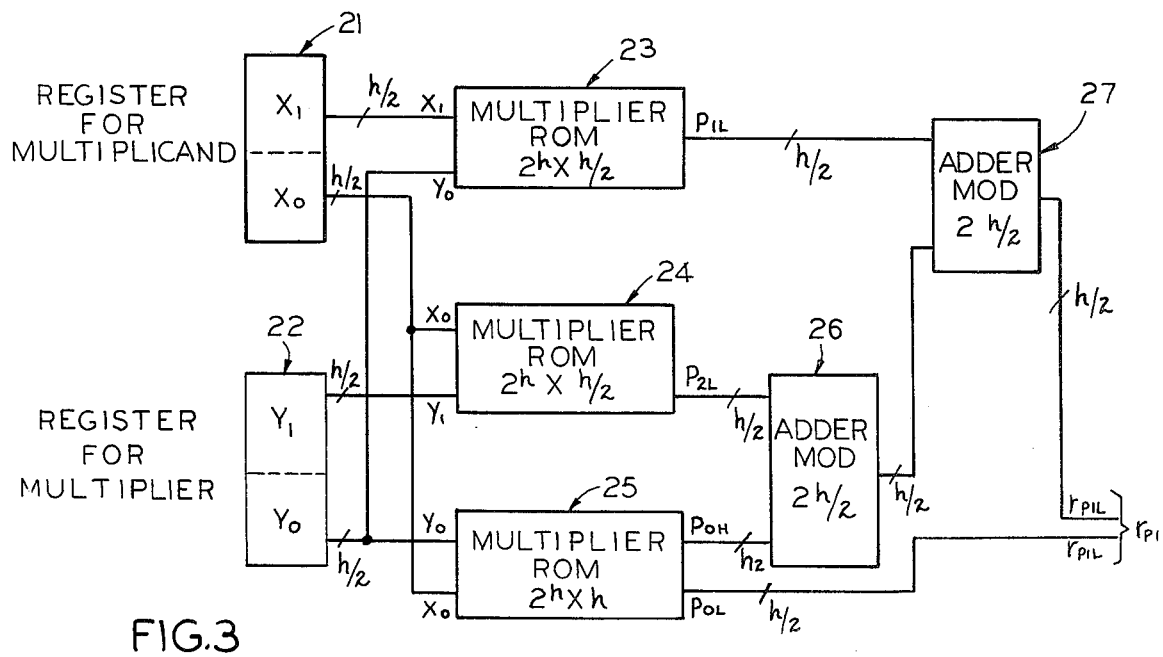
FIG. 3 is a block diagram of a second subsystem for use in the first embodiment.

In FIG. 3, registers 21 and 22 provide a multiplicand X and a multiplier Y respectively. These registers have parallel output terminals on a bit basis. The halved lines of each register can easily be connected to the appropriate terminals for the respective multiplicands and multipliers of the multipliers 23, 24, 25. The output of the multiplier 25 is $P_0$ which is an h-bit length, the lower h/2 bit portion is equal to residue $r_{p1L}$. Multipliers 23, 24, have output bits which are lower portions of the respective products, and are of h/2 bit length. The augend and addend terminals of h/2 bit adder 26 are connected to the respective outputs of multiplier 24, 25. Adder 26 generates a sum modulo $2^{h/2}$ which is supplied to the augend terminal of h/2 adder 7. The output of the multiplier 23 is also applied to the addend terminal of adder 7, the output of which is the higher h/2 bit portion of product residue $r_{p1}$. In the above construction, the outputs of the multipliers 23, 24 are only h/2 bits respectively, and summations performed are only of one kind, that is, addition modulo $2^{h/2}$.

In the byte multiplication system, where h is 8, the multipliers used in this system are nibble multipliers. The multiplication table as indicated in Table 3 can be used to construct a ROM by which nibble multiplications may be performed. To construct it, a product such as $X_0 Y_0$ is deposited at an address specified by $X_0 Y_0$ which is assumed as byte address number.

Table 4 is appended for manual check of hexadecimal addition.

An example will help an understanding of the h-th powered radix system operation. According to this example, MULTIPLY 234 AND 175. Because the system is a binary one, decimal numbers must be transformed to the hexadecimal forms even in manual calculation. $X = 234 = EA(H)$, $Y = 175 = AF(H)$. Hence $X_1 = E$, $X_0 = A$, $Y_1 = A$, $Y_0 = F$. From Table 3, $P_0 = X_0 Y_0 = A \times F = 96(H)$; $P_{0H} = 9$, $P_{0L} = 6 = r_{p1L}$. $P_1 = X_0 Y_1 = A \times A = 64$, $P_{1L} = 4$; $P_2 = X_1 Y_0 = E \times F = D2$, $P_{2L} = 2$. $r_{p1H} = 4 + 2 + 9 = F$; therefore $r_{p1} = F6$ (hexadecimal); in binary form, it is 11110110.

For product residue $r_{p1}$ modulo, the h-th powered radix plays the crucial role in the dual moduli multiplication system. The residue is derived by means of a transform method using exponents.

The modulus of the system for generating product residue $r_{p1}$ is not prime. Thus, Euler function P(m) as shown in equation (9), indicating that the number of exponents which that a can be in a one to one correspondence to residues with the modulus, is decreased to one-half of the number of exponents for the prime modulus. This means that an exponent transform can be performed with half of the numbers in the residue class with the modulus.

Therefore, the Euler product residue $r_{p1}$ can be obtained only when odd numbers are being multiplied. On the contrary, the present preferred embodiment of the inventions gives the product residue $r_{p1}$ for every integers being multiplied, and so requires no compensating schemes. And further, the product residue $r_{p1}$ gives the lower portion of said product.

Therefore, a longer 2h-bit adder is not required to obtain the product.

The operation and structure of the combining scheme for obtaining the higher portion of said product:

This subsystem of the dual moduli multiplication system is shown by box 5 in FIG. 1.

The two inputs in this subsystem 5 are the two outputs that are obtained separately and independently from the respective subsystems 3, 4 with respective different moduli. The integers being multiplied are applied concurrently to box 5, and are combined into the higher bit portion of the product.

The basic principle of operation of the system is derived from the equation (25). One of the inputs to box 5 is the product residue output from the multiplying subsystem 5 with the prescribed prime modulus, denoted as $r_{p2}$. This residue $r_{p2}$ is produced on the output of subsystem 3, when applied h-bit integers X, Y are being multiplied.

Similarly, another input to box 5 is the product residue from the multiplying subsystem 4 with h-th powered radix $r_{p1}$ modulus, denoted as $r_{p1}$. This residue $r_{p1}$ is produced, when the applied X, Y multiplication occurs.

These product residues $r_{p1}$ and $r_{p2}$ are applied to combining scheme 5.

Concerning the right-hand side of the equation (25), the higher h-bit portion of the product is obtained by the sum of an integer represented by the first term and a carry bit generated from the addition of integers representing the second and third terms.

When the carry bit is not generated, the higher portion of the product is equal to an integer of the first term.

The integer representing the first term other than $2^h$ is equal to the integer representing the second term as the equation (25) indicates, and can be computed by complementing $r_{p2}$, and then by performing the addition modulo $2^2$ of $r_{p1} + \overline{r_{p2}} + 1$.

The formal representation of the integer is given as $r_{p1} - r_{p2} (\text{mod } 2^h)$. When we add two integers $r_{p1} - r_{p2} (\text{mod } 2^h)$ and $r_{p2}$, if overflow occurs, we must consider the carry bit.

However, such an addition is not necessary in the combining scheme 5. The reason comes from the fact indicated equations in (29), (30).

In fact, the subtraction $r_{p1} - r_{p2} (\text{mod } 2^h)$ is performed by the addition $r_{p1} + \overline{r_{p2}} + 1$ by an adder modulo $2^h$. In this addition, it should be mentioned that if $r_{p1} > r_{p2}$, then the carry-out bit generates, but if $r_{p1} < r_{p2}$, then the carry-out bit is not generated. Therefore, if the carry-out bit of the adder performing $r_{p1} - r_{p2} (\text{mod } 2^h)$ is complemented, then the conditions indicated by the relationship of equations (29), (30) are satisfied, so that the addition such as $(r_{p1} - r_{p2} (\text{mod } 2^h)) + r_{p2}$ is not necessary.

This simple fact can be checked by a 4-bit number as follows: $r_{p1} = 2$, $r_{p2} = 5$; $2 - 5 = +\overline{5} + 1 = 2 + A + 1 = D = 01101$, indicating that no carry-out bit is generated, while $r_{p1} = 5$, $r_{p2} = 2$; $5 - 2 = 5 + \overline{2} + 1 = 5 + D + 1 = 18 = 10011$, indicating carry-out bit not generated.

These operations thus far explained, are automatically implemented by digital circuits.

Figure 4:
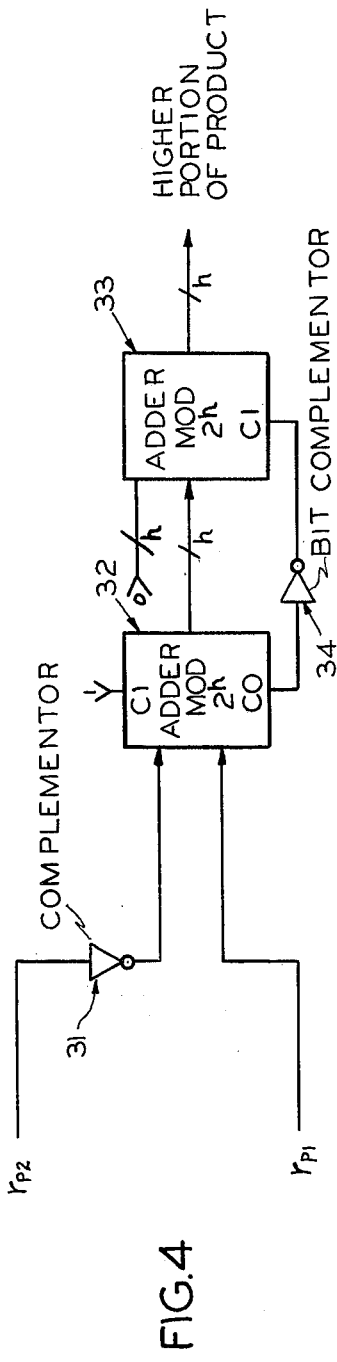
FIG. 4 is a block diagram of a combining scheme for use in the first embodiment.

FIG. 4 shows the structure of the combining scheme of box 5 (FIG. 1). It is composed of two complementors 31 or 34 and two adders modulo $2^h$. The product residue $r_{p2}$ is complemented by a complementor 11 generating residue $\overline{r_{p2}}$, which is applied to the addend terminal of an h-bit adder 32.

The product residue $r_{p1}$ is applied to the augend terminal of adder 32. Holding a carry-in terminal of the adder 32 as 1, then the integer representing by $r_{p1} - r_{p2} (\text{mod } 2^h)$ appears on the sum terminal of adder 32, and a carry-out bit appears on the carry-out terminal of adder 32 which changes between 1 or 0, according to whether residues $r_{p1} > r_{p2}$ or $r_{p1} < r_{p2}$. The carry-out terminal is connected to a complementor 34. Then the output of complementor 34 changes between 0 or 1, according as $r_{p1} < r_{p2}$ or $r_{p1} < r_{p2}$.

An adder 33 receives the sum modulo $2^h$ of adder 32 to the addend terminal, thereby holding all bits of the augend terminal as 0's, and connecting its carry-in terminal to the output of complementor 34. Finally, the higher portion of the product is provided on the sum terminal of adder 33.

An example will help understanding of the combining scheme (FIG. 4) operation: MULTIPLY 234 AND 175. From the previous examples; $r_{p1} = F6(H)$, on the other hand, $r_{p2} = 87$ in decimal, converting $r_{p2}$ to hexadecimal, $r_{p2} = 57(H)$. Complementing $\overline{r_{p2}} = A8$, the higher portion of the product is $F6 + A8 + 1 \pmod{2^8} = 9F$. Note in this case $r_{p1} > r_{p2}$. Therefore, the product is 9FF6, and the decimal equivalent is $36864 + 3840 + 240 + 6 = 40950$. This is equal to $234 \times 175$.

Consequently, the combining scheme providing the higher h-bit portion of the product, by applying the product residue $r_{p1}$ with the h-th powered radix modulus, and the complement of the product residue $r_{p2}$ with prime modulus which is one integer greater than the former modulus. The scheme comprises two adders and a carry-out bit complementor, the first adder computing the difference between the residues modulo $2^h$, and thereafter generating a carry-out bit. The complementor complements the carry-out bit, and connects to a carry-in bit terminal of the second adder. The second adder provides the higher h-bit portion of the product by applying the sum modulo $2^h$ of the first adder.

In the case of applying the product residue $r_{p2}$ directly, the combining scheme must have an h-bit complementor for complementing the product residue.

Figure 5:
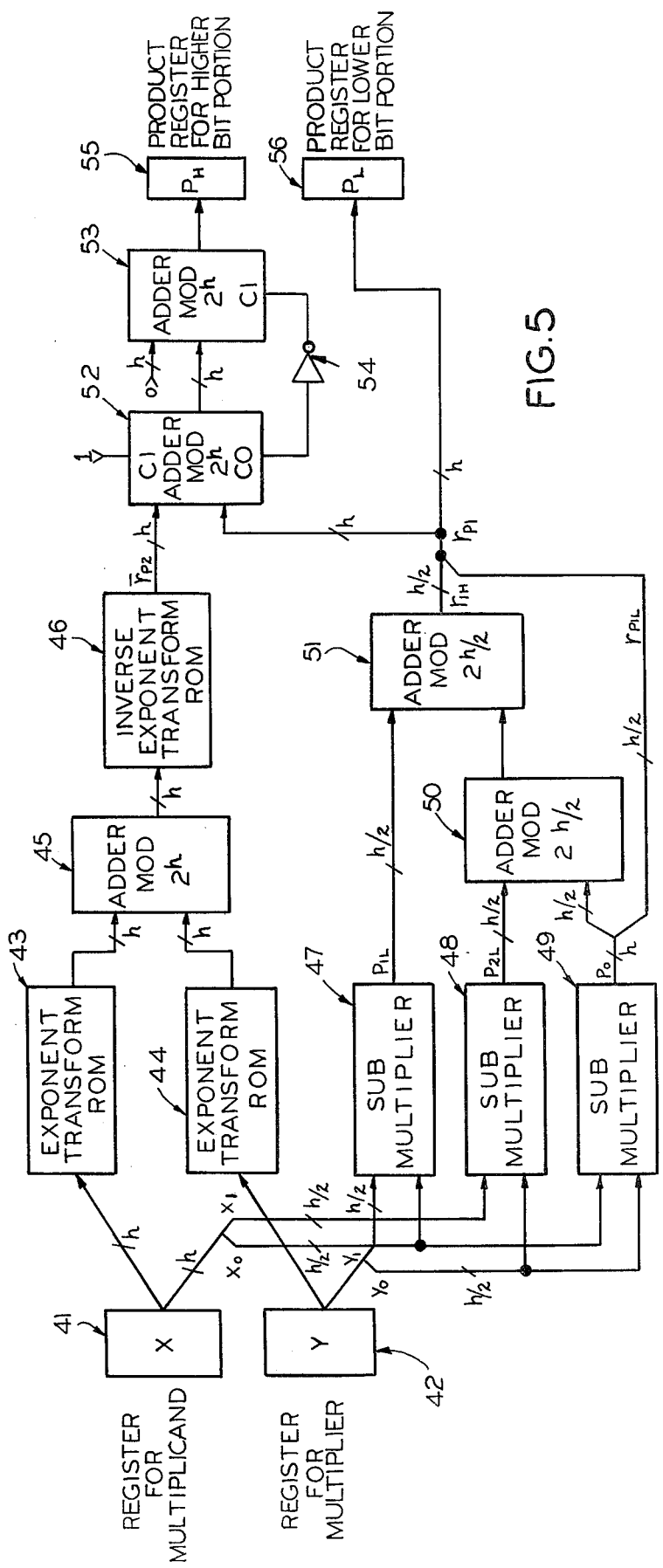
FIG. 5 is a block diagram of a multiplication system according to the first embodiment of this invention.

The dual moduli multiplication system for multiplying two integers of h-bit length:

The system is constructed as shown in FIG. 5. In the FIG. 5, 41, 42 registers store information for setting two integers being multiplied. The integers are applied in parallel and concurrently to the first multiplying subsystem 43–46 shown in the upper portion of the (FIG. 5) diagram, and to the second multiplying subsystem 47–51 shown in the lower portion of the diagram.

The first subsystem generates a complement of a product residue $\overline{r_{p2}}$ by applying the integers being multiplied, while the second subsystem generates a product residue $r_{p1}$, which is equal to the lower portion of a product. Further, a third subsystem 52,53 on the right-hand side, combines the complement product residue $\overline{r_{p2}}$ and product residue $r_{p1}$ into the higher portion of the product.

The first subsystem 43–46 is governed by the modulus that equals a prescribed prime number, in the binary number system, being in the form of $2^h + 1$, wherein h is equal to the binary numbers bit length being multiplied. Exponent transform ROM's 43,44 perform the transformation of a residue to an exponent of a prescribed primitive root which is inherent to the prime modulus. Multiplying integers are equal to residues, so that when the integers are being multiplied, corresponding exponents are obtaining at the outputs the ROM's 43,44. These exponents are summed modulo $2^h$ by an h-bit adder 45 generating a sum exponent. An inverse exponent transform ROM 46 is constructed by storing a complement of a residue at the address specified by a corresponding exponent. Therefore the first subsystem 43–46 generates a complement of the product residue $\overline{r_{p2}}$ modulo, which is a prescribed prime number. The complement can be written as $\overline{r_{p2}}$.

The second subsystem 47–51 is governed by the modulus equal to the h-th powered radix of the integers being multiplied, in the binary system forming the embodiment of the invention, being taken the form of $2^h$. Halved integers are obtained by partitioning the integers being multiplied, and are generated by the appropriate connections as shown in FIG. 5. The halved integers are multiplied separately, generating three products $P_{1L}$, $P_{2L}$, $P_0$ by respective submultipliers 47, 48, 49. In which the product $P_0$ of the submultiplier 49 has a bit length which is equal to that of the integers being multiplied. The lower bit portion of product $P_{0L}$ giving directly the lower portion of the product residue $r_{p1}$. Other halved product integers $P_{0H}$, $P_{1L}$, $P_{2L}$ are summed modulo $2^{h/2}$ by two adders 50, 51 generating the higher bit portion of product residue $r_{p1}$. Thus, residue $r_{p1}$ is providing the lower portion of the product and further an input for the third subsystem 52-54.

The third subsystem 52-56 applies the complement of product residue $\bar{r}_{p2}$ and another product residue $r_{p1}$, by generating the higher portion of the product. This third subsystem comprises only the two h-bit adders 52,53 and a one bit complementor 54. The first adder 52 performs a summation of the product residues plus 1, generating a carry-out bit which is complemented. The resulting sum transfers to the second adder 53. The adder 53 accepts the sum modulo $2^h$ of 12, providing the higher portion of the product. The complementor is numbered 54. Registers 55,56 are used for storing the product.

The dual moduli multiplication system for every integer of a binary number is explained thus far.

However, the embodied multiplier has several limitations. First, the binary numbers being multiplied must be of the prescribed bit length. If denoted as h; h must be even. Second, in a dual moduli system, one of subsystem must have a modulus which is a prefixed prime number related to the prescribed bit length of binary numbers, and therefore is of a form such as $2^h+1$. Therefore, the system can be operated for h=4, 8, 16. But these multipliers are very useful as a basic module and for a stand-alone device for computing.

The system embodied as the invention has features that enable very fast multiplication in an asynchronous mode, and of stable and round-off error free operation, because it uses the combined structure of only static devices requiring no timing circuitry.

The multiplication time $T_m$ of this binary multiplier is approximately equal to the sum of twice the ROM access time $T_{rac}$, and three times the binary adder delay $T_{ad}$, therefore, $$T_m \approx 2T_{rac} + 3T_{ad}$$

For instance, using adders of bipolar a type, $T_{ad}=10$ ns, and the ROM's access time is 50 ns; then the multiplication time attained is about 130 ns or so.

A decimal dual moduli multiplication system:

Each decimal digit is expressed by its 4-bit binary equivalent, called a BCD code. By using a BCD code, decimal number arithmetic can be performed on digital devices. In the description which follows, decimal numbers are expressed by their 4-bit equivalents.

The radix q of the decimal number is 10, as previously mentioned. To construct a dual moduli multiplication system, one of the subsystem for generating a product residue for decimal integers being multiplied must have a prescribed prime integer related to the number of digits of the integers being multiplied, and called the "prime modulus" of the subsystem.

Another subsystem of the dual moduli system must have the modulus equal to the radix powered the digit length of integers being multiplied.

By searching for the dual moduli satisfying the above mentioned conditions, the following decimal dual moduli multiplication system turns out to be a very useful means for fast and asynchronous multiplication for decimal integers.

This is another preferred embodiment of the invention.

A two digit dual moduli multiplication system is embodied, that is composed of three basic subsystems, providing a four-digit product when two digit integers are being multiplied.

The first subsystem has the prescribed modulus equal to 101, which is a prime number and in the form of $10^2+1$. As previously mentioned, because modulus 101 is prime, all two digit integers are included in the reduced residue class, and the basic relationships of equations (10), (11) hold.

Therefore, two-digit integers are transformed to respective exponents of the primitive root g (=1) inherent to the prime modulus 101. This transform is called an exponent transform, being tabulated in Table 5. For instance, a residue 90 is transformed to an exponent 63. In an inverse exponent transform tabulated in Table 6, an exponent is transformed to a residue.

An exponent transform ROM is constructed by depositing an exponent at an address specified by a residue respectively.

Every integers takes the form of a BCD code, therefore, the number of address lines and word length are both 8, so that a required ROM size is $2^8 \times 8$ bits. An inverse exponent transform ROM is constructed in similar manner, the only difference being a residue and an exponent exchange.

The first subsystem comprises two exponent transform ROM's 63, 64 (FIG. 6), a two-digit BCD adder 65, and an inverse exponent transform ROM 66. When a multiplicand X and a multiplier Y of a two-digit length are applied to respective exponent transform ROM's 63,64, then respective exponents x, y of a two-digit length appear on the respective outputs of the two ROM's 63,64. The higher and lower digit of these exponents are applied separately to the respective augend and addend terminals of the two-digit BCD adder 65 which generates a two-digit sum exponent. The sum exponent is applied to the inverse exponent transform ROM 66, providing a product residue $r_{p2}$ which is a two digit integer.

The second subsystem 67-71 has the prescribed modulus 100, which equals to a powered radix $10^2$. As previously mentioned, multiplicand X, and multiplier Y are partitioned into one-portions as follows: $X=X_1X_0$; $Y=Y_1Y_0$; then $X_0$, $Y_0$ are a one digit integer of a $10^0$ digit position, and $X_1$, $Y_1$ are a one digit integer of a $10^1$ digit position. Therefore, $$X_0 \times Y_0 = P_0 = {}_{0H}10^1 + P_{0L}$$
$$X_0 \times Y_1 = P_1 = P_{1H}10^2 + P_{1L}10^1$$
$$X_1 \times Y_0 = P_2 = P_{2H}10^2 + P_{2L}10^1 \tag{55}$$

If a product residue modulo $10^2$ is $r_{p1}$, then the following congruent relation holds:

$$XY \equiv r_{p1} \pmod{10^2} \tag{56}$$

Hence, from equations (55), (56), (6), (7):

$$r_{p1} = (P_{0H} + P_{1L} + P_{2L} (\bmod 10^1))10^1 + P_{0L} \tag{57}$$

Therefore, the product residue $r_{p1}$ is obtained as follows: The three product $P_0$, $P_{1L}$, $P_{2L}$ are obtained by three one-digit ROM multipliers 67-69. Each of these multiplier ROM's 67-69 is constructed by depositing a product at an address specified by two digit number such as $X_0Y_0$, $X_0Y_1$, $X_1Y_0$, respectively. Then, these products are applied to two stages of one digit BCD adders. Then, finally, the higher one digit of the product residue $r_{p1}$ is obtained on the sum terminal of the final one digit BCD adder 71. The lower portion of residue $r_{p1}$ is $P_{0L}$.

An example will clarify above procedure: MULTIPLY 90 and 75; then $X=90$, $Y=75$; $X_1=9$, $X_0=0$, $Y_1=7$, $Y_0=5$; $P_0=00$, $P_1=00$, $P_2=35$; $P_{0L}=0=r_{p1L}$, $P_{0H}=0$, $P_{1L}=0$, $P_{2L}=5$; $P_{0H}+P_{1L}+P_{2L}(\text{mod } 10)=r_{p1H}=5$; therefore the lower two digit of product $r_{p1}=50$.

While product residue $r_{p2}$ is obtained from Tables 5, 6; $X=90$, $Y=75$; respective exponents $x=63$, $y=17$; sum exponent mod $10^2=63+17 \pmod{100}=80$ are obtained from Table 6, $r_{p2}=84$.

The third subsystem 72–74 combines the product residues $r_{p1}$, $r_{p2}$ and generates the higher portion of the product. The basic operation is derived from the relationships (29), (30), which are the consequence of deep considerations of the formal basic equation (25).

Higher portion of the product denoted by H(XY) is given by the relationship, as follows:

$$H(XY)=r_{p1}-r_2 \pmod{10^2};\ r_{p1}>r_{p2}$$
$$H(XY)=r_{p1}r_{p2} \pmod{10^2}+1;\ r_{p1}<r_{p2} \quad (58)$$

The subtraction $r_{p1}-r_{p2} \pmod{10^2}$ is performed in first two-digit BCD adder as follows:

$$S=r_{p1}+\overline{r_{p2}}+1 \pmod{10^2} \quad (59)$$

wherein $r_{p1}$ and $\overline{r_{p2}}$ are applied to the augend and addend terminals of the BCD adder holding the carry-in terminal as 1. The sums of modulo $10^2$ are applied to the addend terminal of the second two digit BCD adder, holding the augend terminal as 0's.

In the first adder 72, if $r_{p1}>r_{p2}$, the carry-out is 1, or if $r_{p1}<r_{p2}$, the carry-out is 0 therefore, a one bit complementor 73 is provided between the carry-out terminal CO of the first adder 72 and the carry-in terminal CI of the second adder 74, in order to satisfy the basic relation (58).

Therefore, the third subsystem 72–74 is composed of a complementor for $r_{p2}$, two BCD adders 72–74, and a one bit complementor 73.

An example will clarify above mentioned procedure: Use the same problem as before. MULTIPLY 90 and 75; $r_{p1}=50$, $r_{p2}=84$ are already obtained. The complement of 84 is obtained by $99-84=15$; therefore $\overline{r_{p2}}$ is 15. From equation (59), we obtain the following result; $S=S+50+15+1=66$. Since $r_{p1}=r_{p2}$, from equation (58), $H(XY)=S+1=67$; the product $=6750$. Note that the above manual calculation is performed fast and automatically.

Figure 6:
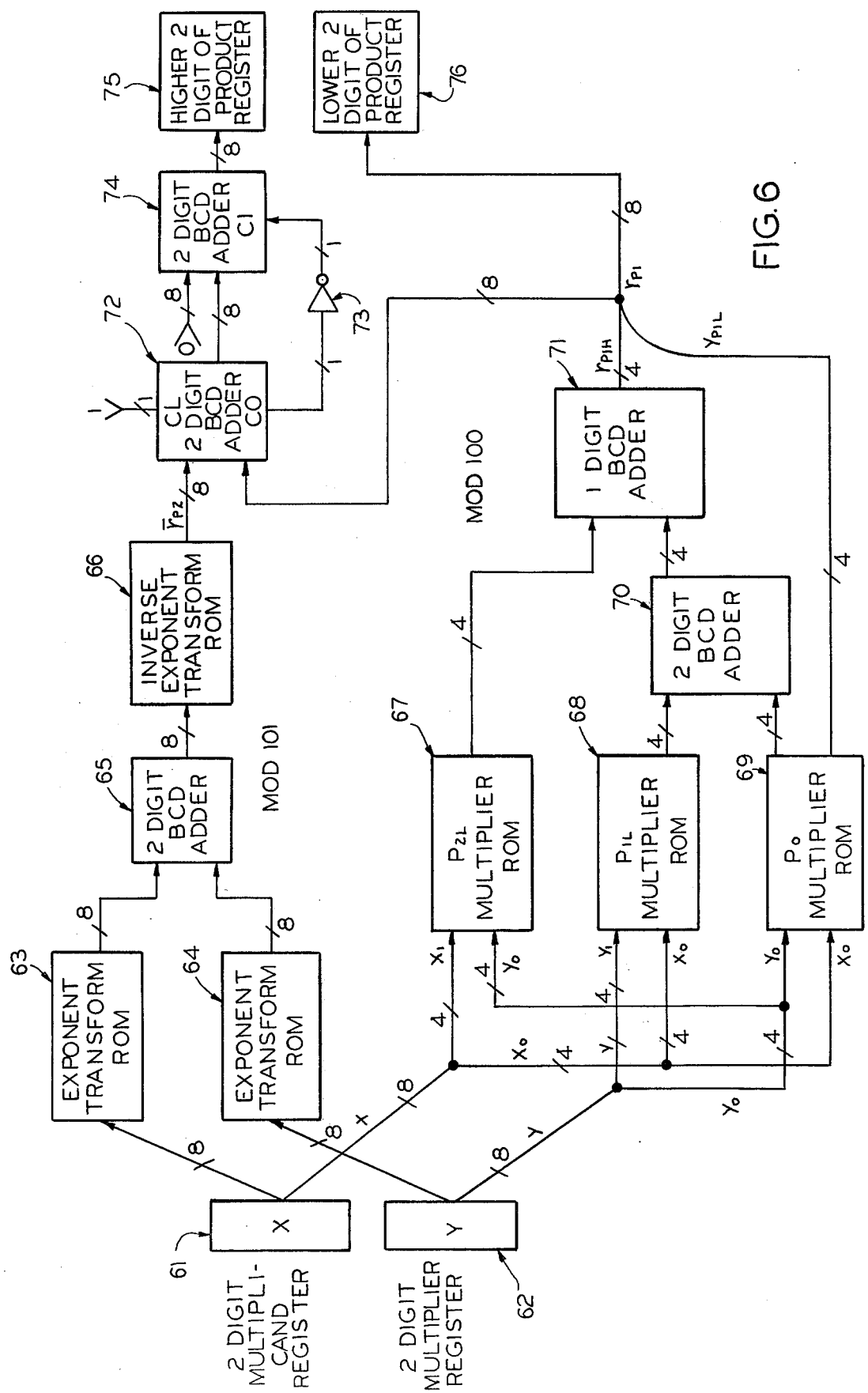
FIG. 6 is a block diagram of a multiplication system according to a second embodiment of this invention.

FIG. 6 shows a diagram of the decimal BCD dual moduli multiplier for the two-digit integers being multiplied.

Multiplying numbers are placed in registers 61,62 these numbers being denoted as X, Y are applied in parallel to a modulo 101 subsystem and a modulo 100 subsystem. Exponent transform ROM's 63,64 transform X, Y to their respective exponents x, y which are applied to two-digit BCD adder 65 obtaining a sum exponent modulo 100.

The sum exponent is applied to an inverse exponent transform ROM 66 that is constructed by depositing a complemented product residue $\overline{r_{p2}}$ at an address specified by the sum exponent, and generates the product residue corresponding to the sum exponent.

The mod 100 subsystem is composed of three 1-digit multipliers 67, 68, 69 producing $P_{2L}$, $P_{1L}$ of one digit each, and $P_0$ of two-digits. The values $P_{0H}$ and $P_{1L}$ are applied to one digit BCD adder 70 producing a sum modulo 10, which applied to augend terminal of one digit BCD adder 71. To the addend terminal of adder 71 is also being applied $P_{2L}$, thereby producing a one digit product residue $r_{p1H}$. The $P_{0L}$ digit is equal to $r_{p1L}$. The residues $r_{p1H}$ and $r_{p1L}$ constitute a residue $r_{p1}$.

The residues $r_{p1}$ and $\overline{r_{p2}}$ are applied to a 2-digit BCD adder 72, holding a carry-in terminal at 1. A carry-out terminal is connected via a complementor 73 to a carry-in terminal of a 2-digit BCD adder 74. A sum modulo 100 is added by adder 74, holding the other 2-digit input terminals at 0's. The higher digit of a product is obtained on sum terminal of BCD adder 74.

Product registers 75,76 are used for storing separately the 4-digit product.

Thus far, a detailed explanation has been given of the decimal multiplier using the dual moduli system.

The features of this system are fast, error-free, and asynchronous operations. Therefore, like adder logic circuitry, we need consider only the delay time of the multiplication, so that fast and longer digit multiplication can be embodied by a firmware procedure, with a fast clock rate.

The two digit decimal multiplier is a preferred embodiment of the invention, presenting a useful basic module for computing systems.

Tables 1, 2 are the transform tables for use in the transform of a residue to an exponent, and the reverse, in which the integer length $h=8$, modulus$=257$, and primitive root$=10$.

Table 3 is the multiplication table for nibbles in a hexadecimal form using a modulo 256 subsystem.

Table 4 is a reference table of decimal additions, for checking.

Tables 5, 6 are decimal transform tables for use in the transform of a 2-digit decimal integer to an exponent, and the reverse.

TABLE 1

| Residue | Exponent | Residue | Exponent | Residue | Exponent | Residue | Exponent | Residue | Exponent | Residue | Exponent | Residue | Exponent | Residue | Exponent | Residue | Exponent | Residue | Exponent | Residue | Exponent |
|---|---|---|---|---|---|---|---|---|---|---|---|---|---|---|---|---|---|---|---|---|---|
| 1 | 0 | 26 | 86 | 51 | 31 | 76 | 27 | 101 | 125 | 126 | 225 | 151 | 15 | 176 | 220 | 201 | 83 | 226 | 190 | 251 | 39 |
| 2 | 80 | 27 | 5 | 52 | 166 | 77 | 127 | 102 | 111 | 127 | 135 | 152 | 107 | 177 | 113 | 202 | 205 | 227 | 216 | 252 | 49 |
| 3 | 87 | 28 | 131 | 53 | 63 | 78 | 173 | 103 | 79 | 128 | 48 | 153 | 118 | 178 | 250 | 203 | 213 | 228 | 114 | 253 | 32 |
| 4 | 160 | 29 | 242 | 54 | 85 | 79 | 122 | 104 | 246 | 129 | 176 | 154 | 207 | 179 | 45 | 204 | 191 | 229 | 3 | 254 | 215 |
| 5 | 177 | 30 | 88 | 55 | 77 | 80 | 241 | 105 | 235 | 130 | 7 | 155 | 239 | 180 | 255 | 205 | 38 | 230 | 133 | 255 | 208 |
| 6 | 167 | 31 | 62 | 56 | 211 | 81 | 92 | 106 | 143 | 131 | 97 | 156 | 253 | 181 | 155 | 206 | 159 | 231 | 214 | | |
| 7 | 227 | 32 | 144 | 57 | 210 | 82 | 197 | 107 | 137 | 132 | 147 | 157 | 130 | 182 | 57 | 207 | 50 | 232 | 226 | | |
| 8 | 240 | 33 | 243 | 58 | 66 | 83 | 25 | 108 | 165 | 133 | 94 | 158 | 202 | 183 | 61 | 208 | 70 | 233 | 199 | | |
| 9 | 174 | 34 | 24 | 59 | 26 | 84 | 218 | 109 | 141 | 134 | 76 | 159 | 150 | 184 | 116 | 209 | 23 | 234 | 4 | | |
| 10 | 1 | 35 | 148 | 60 | 168 | 85 | 121 | 110 | 157 | 135 | 182 | 160 | 65 | 185 | 30 | 210 | 59 | 235 | 108 | | |
| 11 | 156 | 36 | 78 | 61 | 230 | 86 | 169 | 111 | 196 | 136 | 184 | 161 | 103 | 186 | 229 | 211 | 84 | 236 | 186 | | |
| 12 | 247 | 37 | 109 | 62 | 142 | 87 | 73 | 112 | 35 | 137 | 120 | 162 | 172 | 187 | 100 | 212 | 223 | 237 | 209 | | |
| 13 | 6 | 38 | 203 | 63 | 145 | 88 | 140 | 113 | 110 | 138 | 43 | 163 | 139 | 188 | 91 | 213 | 188 | 238 | 251 | | |
| 14 | 51 | 39 | 93 | 64 | 224 | 89 | 170 | 114 | 34 | 139 | 234 | 164 | 21 | 189 | 232 | 214 | 217 | 239 | 126 | | |
| 15 | 8 | 40 | 161 | 65 | 183 | 90 | 175 | 115 | 53 | 140 | 52 | 165 | 164 | 190 | 124 | 215 | 10 | 240 | 72 | | |
| 16 | 64 | 41 | 117 | 66 | 67 | 91 | 233 | 116 | 146 | 141 | 18 | 166 | 105 | 191 | 195 | 216 | 245 | 241 | 192 | | |
| 17 | 200 | 42 | 138 | 67 | 252 | 92 | 36 | 117 | 180 | 142 | 181 | 167 | 47 | 192 | 55 | 217 | 33 | 242 | 136 | | |
| 18 | 254 | 43 | 89 | 68 | 104 | 93 | 149 | 118 | 106 | 143 | 162 | 168 | 42 | 193 | 96 | 218 | 221 | 243 | 179 | | |
| 19 | 123 | 44 | 60 | 69 | 219 | 94 | 11 | 119 | 171 | 144 | 238 | 169 | 12 | 194 | 17 | 219 | 75 | 244 | 134 | | |
| 20 | 81 | 45 | 95 | 70 | 228 | 95 | 44 | 120 | 248 | 145 | 163 | 170 | 201 | 195 | 14 | 220 | 237 | 245 | 119 | | |
| 21 | 58 | 46 | 212 | 71 | 101 | 96 | 231 | 121 | 56 | 146 | 68 | 171 | 41 | 196 | 102 | 221 | 206 | 246 | 28 | | |
| 22 | 236 | 47 | 187 | 72 | 158 | 97 | 193 | 122 | 54 | 147 | 29 | 172 | 249 | 197 | 40 | 222 | 20 | 247 | 129 | | |
| 23 | 132 | 48 | 151 | 73 | 244 | 98 | 22 | 123 | 204 | 148 | 13 | 173 | 90 | 198 | 154 | 223 | 152 | 248 | 46 | | |
| 24 | 71 | 49 | 198 | 74 | 189 | 99 | 74 | 124 | 222 | 149 | 37 | 174 | 153 | 199 | 194 | 224 | 115 | 249 | 112 | | |
| 25 | 98 | 50 | 178 | 75 | 185 | 100 | 2 | 125 | 19 | 150 | 9 | 175 | 69 | 200 | 82 | 225 | 16 | 250 | 99 | | |

TABLE 2

| Exponent | Residue | Exponent | Residue | Exponent | Residue | Exponent | Residue | Exponent | Residue | Exponent | Residue | Exponent | Residue | Exponent | Residue | Exponent | Residue | Exponent | Residue | Exponent | Residue |
|---|---|---|---|---|---|---|---|---|---|---|---|---|---|---|---|---|---|---|---|---|---|
| 1 | 10 | 26 | 59 | 51 | 14 | 76 | 134 | 101 | 71 | 126 | 239 | 151 | 48 | 176 | 129 | 201 | 170 | 226 | 232 | 251 | 238 |
| 2 | 100 | 27 | 76 | 52 | 140 | 77 | 55 | 102 | 196 | 127 | 77 | 152 | 223 | 177 | 5 | 202 | 158 | 227 | 7 | 252 | 67 |
| 3 | 229 | 28 | 246 | 53 | 115 | 78 | 36 | 103 | 161 | 128 | 0 | 153 | 174 | 178 | 50 | 203 | 38 | 228 | 70 | 253 | 156 |
| 4 | 234 | 29 | 147 | 54 | 122 | 79 | 103 | 104 | 68 | 129 | 247 | 154 | 198 | 179 | 243 | 204 | 123 | 229 | 186 | 254 | 18 |
| 5 | 27 | 30 | 185 | 55 | 192 | 80 | 2 | 105 | 166 | 130 | 157 | 155 | 181 | 180 | 117 | 205 | 202 | 230 | 61 | 255 | 180 |
| 6 | 13 | 31 | 51 | 56 | 121 | 81 | 20 | 106 | 118 | 131 | 28 | 156 | 11 | 181 | 142 | 206 | 221 | 231 | 96 | 0 | 1 |
| 7 | 130 | 32 | 253 | 57 | 182 | 82 | 200 | 107 | 152 | 132 | 23 | 157 | 110 | 182 | 135 | 207 | 154 | 232 | 189 | | |
| 8 | 15 | 33 | 217 | 58 | 21 | 83 | 201 | 108 | 235 | 133 | 230 | 158 | 72 | 183 | 65 | 208 | 255 | 233 | 91 | | |
| 9 | 150 | 34 | 114 | 59 | 210 | 84 | 211 | 109 | 37 | 134 | 244 | 159 | 206 | 184 | 136 | 209 | 237 | 234 | 139 | | |
| 10 | 215 | 35 | 112 | 60 | 44 | 85 | 54 | 110 | 113 | 135 | 127 | 160 | 4 | 185 | 75 | 210 | 57 | 235 | 105 | | |
| 11 | 94 | 36 | 92 | 61 | 183 | 86 | 26 | 111 | 102 | 136 | 242 | 161 | 40 | 186 | 236 | 211 | 56 | 236 | 22 | | |
| 12 | 169 | 37 | 149 | 62 | 31 | 87 | 3 | 112 | 249 | 137 | 107 | 162 | 143 | 187 | 47 | 212 | 46 | 237 | 220 | | |
| 13 | 148 | 38 | 205 | 63 | 53 | 88 | 30 | 113 | 177 | 138 | 42 | 163 | 145 | 188 | 213 | 213 | 203 | 238 | 144 | | |
| 14 | 195 | 39 | 251 | 64 | 16 | 89 | 43 | 114 | 228 | 139 | 163 | 164 | 165 | 189 | 74 | 214 | 231 | 239 | 155 | | |
| 15 | 151 | 40 | 197 | 65 | 160 | 90 | 173 | 115 | 224 | 140 | 88 | 165 | 108 | 190 | 226 | 215 | 254 | 240 | 8 | | |
| 16 | 225 | 41 | 171 | 66 | 58 | 91 | 188 | 116 | 184 | 141 | 109 | 166 | 52 | 191 | 204 | 216 | 227 | 241 | 80 | | |
| 17 | 194 | 42 | 168 | 67 | 66 | 92 | 81 | 117 | 41 | 142 | 62 | 167 | 6 | 192 | 241 | 217 | 214 | 242 | 29 | | |
| 18 | 141 | 43 | 138 | 68 | 146 | 93 | 39 | 118 | 153 | 143 | 106 | 168 | 60 | 193 | 97 | 218 | 84 | 243 | 33 | | |
| 19 | 125 | 44 | 95 | 69 | 175 | 94 | 133 | 119 | 245 | 144 | 32 | 169 | 86 | 194 | 199 | 219 | 69 | 244 | 73 | | |
| 20 | 222 | 45 | 179 | 70 | 208 | 95 | 45 | 120 | 137 | 145 | 63 | 170 | 89 | 195 | 191 | 220 | 176 | 245 | 216 | | |
| 21 | 164 | 46 | 248 | 71 | 24 | 96 | 193 | 121 | 85 | 146 | 116 | 171 | 119 | 196 | 111 | 221 | 218 | 246 | 104 | | |
| 22 | 98 | 47 | 167 | 72 | 240 | 97 | 131 | 122 | 79 | 147 | 132 | 172 | 162 | 197 | 82 | 222 | 124 | 247 | 12 | | |
| 23 | 209 | 48 | 128 | 73 | 87 | 98 | 25 | 123 | 19 | 148 | 35 | 173 | 78 | 198 | 49 | 223 | 212 | 248 | 120 | | |
| 24 | 34 | 49 | 252 | 74 | 99 | 99 | 250 | 124 | 190 | 149 | 93 | 174 | 9 | 199 | 233 | 224 | 64 | 249 | 172 | | |
| 25 | 83 | 50 | 207 | 75 | 219 | 100 | 187 | 125 | 101 | 150 | 159 | 175 | 90 | 200 | 17 | 225 | 126 | 250 | 178 | | |

TABLE 3

| Multi-plicand | Multi-plier | Product | Multi-plicand | Multi-plier | Product | Multi-plicand | Multi-plier | Product | Multi-plicand | Multi-plier | Product | Multi-plicand | Multi-plier | Product | Multi-plicand | Multi-plier | Product | Multi-plicand | Multi-plier | Product |
|---|---|---|---|---|---|---|---|---|---|---|---|---|---|---|---|---|---|---|---|---|
| 0 | 0 | 00 | 2 | 5 | 0A | 4 | A | 28 | 6 | F | 5A | 9 | 4 | 24 | B | 9 | 63 | D | E | B6 |
| 0 | 1 | 00 | 2 | 6 | 0C | 4 | B | 2C | 7 | 0 | 00 | 9 | 5 | 2D | B | A | 6E | D | F | C3 |
| 0 | 2 | 00 | 2 | 7 | 0E | 4 | C | 30 | 7 | 1 | 07 | 9 | 6 | 36 | B | B | 79 | E | 0 | 00 |
| 0 | 3 | 00 | 2 | 8 | 10 | 4 | D | 34 | 7 | 2 | 0E | 9 | 7 | 3F | B | C | 84 | E | 1 | 0E |
| 0 | 4 | 00 | 2 | 9 | 12 | 4 | E | 38 | 7 | 3 | 15 | 9 | 8 | 48 | B | D | 8F | E | 2 | 1C |
| 0 | 5 | 00 | 2 | A | 14 | 4 | F | 3C | 7 | 4 | 1C | 9 | 9 | 51 | B | E | 9A | E | 3 | 2A |
| 0 | 6 | 00 | 2 | B | 16 | 5 | 0 | 00 | 7 | 5 | 23 | 9 | A | 5A | B | F | A5 | E | 4 | 38 |
| 0 | 7 | 00 | 2 | C | 18 | 5 | 1 | 05 | 7 | 6 | 2A | 9 | B | 63 | C | 0 | 00 | E | 5 | 46 |
| 0 | 8 | 00 | 2 | D | 1A | 5 | 2 | 0A | 7 | 7 | 31 | 9 | C | 6C | C | 1 | 0C | E | 6 | 54 |
| 0 | 9 | 00 | 2 | E | 1C | 5 | 3 | 0F | 7 | 8 | 38 | 9 | D | 75 | C | 2 | 18 | E | 7 | 62 |
| 0 | A | 00 | 2 | F | 1E | 5 | 4 | 14 | 7 | 9 | 3F | 9 | E | 7E | C | 3 | 24 | E | 8 | 70 |
| 0 | B | 00 | 3 | 0 | 00 | 5 | 5 | 19 | 7 | A | 46 | 9 | F | 87 | C | 4 | 30 | E | 9 | 7E |
| 0 | C | 00 | 3 | 1 | 03 | 5 | 6 | 1E | 7 | B | 4D | A | 0 | 00 | C | 5 | 3C | E | A | 8C |
| 0 | D | 00 | 3 | 2 | 06 | 5 | 7 | 23 | 7 | C | 54 | A | 1 | 0A | C | 6 | 48 | E | B | 9A |
| 0 | E | 00 | 3 | 3 | 09 | 5 | 8 | 28 | 7 | D | 5B | A | 2 | 14 | C | 7 | 54 | E | C | A8 |
| 0 | F | 00 | 3 | 4 | 0C | 5 | 9 | 2D | 7 | E | 62 | A | 3 | 1E | C | 8 | 60 | E | D | B6 |
| 1 | 0 | 00 | 3 | 5 | 0F | 5 | A | 32 | 7 | F | 69 | A | 4 | 28 | C | 9 | 6C | E | E | C4 |
| 1 | 1 | 01 | 3 | 6 | 12 | 5 | B | 37 | 8 | 0 | 00 | A | 5 | 32 | C | A | 78 | E | F | D2 |
| 1 | 2 | 02 | 3 | 7 | 15 | 5 | C | 3C | 8 | 1 | 08 | A | 6 | 3C | C | B | 84 | F | 0 | 00 |
| 1 | 3 | 03 | 3 | 8 | 18 | 5 | D | 41 | 8 | 2 | 10 | A | 7 | 46 | C | C | 90 | F | 1 | 0F |
| 1 | 4 | 04 | 3 | 9 | 1B | 5 | E | 46 | 8 | 3 | 18 | A | 8 | 50 | C | D | 9C | F | 2 | 1E |
| 1 | 5 | 05 | 3 | A | 1E | 5 | F | 4B | 8 | 4 | 20 | A | 9 | 5A | C | E | A8 | F | 3 | 2D |
| 1 | 6 | 06 | 3 | B | 21 | 6 | 0 | 00 | 8 | 5 | 28 | A | A | 64 | C | F | B4 | F | 4 | 3C |
| 1 | 7 | 07 | 3 | C | 24 | 6 | 1 | 06 | 8 | 6 | 30 | A | B | 6E | D | 0 | 00 | F | 5 | 4B |
| 1 | 8 | 08 | 3 | D | 27 | 6 | 2 | 0C | 8 | 7 | 38 | A | C | 78 | D | 1 | 0D | F | 6 | 5A |
| 1 | 9 | 09 | 3 | E | 2A | 6 | 3 | 12 | 8 | 8 | 40 | A | D | 82 | D | 2 | 1A | F | 7 | 69 |
| 1 | A | 0A | 3 | F | 2D | 6 | 4 | 18 | 8 | 9 | 48 | A | E | 8C | D | 3 | 27 | F | 8 | 78 |
| 1 | B | 0B | 4 | 0 | 00 | 6 | 5 | 1E | 8 | A | 50 | A | F | 96 | D | 4 | 34 | F | 9 | 87 |
| 1 | C | 0C | 4 | 1 | 04 | 6 | 6 | 24 | 8 | B | 58 | B | 0 | 00 | D | 5 | 41 | F | A | 96 |
| 1 | D | 0D | 4 | 2 | 08 | 6 | 7 | 2A | 8 | C | 60 | B | 1 | 0B | D | 6 | 4E | F | B | A5 |
| 1 | E | 0E | 4 | 3 | 0C | 6 | 8 | 30 | 8 | D | 68 | B | 2 | 16 | D | 7 | 5B | F | C | B4 |
| 1 | F | 0F | 4 | 4 | 10 | 6 | 9 | 36 | 8 | E | 70 | B | 3 | 21 | D | 8 | 68 | F | D | C3 |
| 2 | 0 | 00 | 4 | 5 | 14 | 6 | A | 3C | 8 | F | 78 | B | 4 | 2C | D | 9 | 75 | F | E | D2 |
| 2 | 1 | 02 | 4 | 6 | 18 | 6 | B | 42 | 9 | 0 | 00 | B | 5 | 37 | D | A | 82 | F | F | E1 |
| 2 | 2 | 04 | 4 | 7 | 1C | 6 | C | 48 | 9 | 1 | 09 | B | 6 | 42 | D | B | 8F | | | |
| 2 | 3 | 06 | 4 | 8 | 20 | 6 | D | 4E | 9 | 2 | 12 | B | 7 | 4D | D | C | 9C | | | |
| 2 | 4 | 08 | 4 | 9 | 24 | 6 | E | 54 | 9 | 3 | 1B | B | 8 | 58 | D | D | A9 | | | |

TABLE 4

| Augend | Addend | Sum | Augend | Addend | Sum | Augend | Addend | Sum | Augend | Addend | Sum | Augend | Addend | Sum | Augend | Addend | Sum | Augend | Addend | Sum |
|---|---|---|---|---|---|---|---|---|---|---|---|---|---|---|---|---|---|---|---|---|
| 0 | 0 | 00 | 2 | 5 | 07 | 4 | A | 0E | 6 | F | 15 | 9 | 4 | 0D | B | 9 | 14 | D | E | 1B |
| 0 | 1 | 01 | 2 | 6 | 08 | 4 | B | 0F | 7 | 0 | 07 | 9 | 5 | 0E | B | A | 15 | D | F | 1C |
| 0 | 2 | 02 | 2 | 7 | 09 | 4 | C | 10 | 7 | 1 | 08 | 9 | 6 | 0F | B | B | 16 | E | 0 | 0E |
| 0 | 3 | 03 | 2 | 8 | 0A | 4 | D | 11 | 7 | 2 | 09 | 9 | 7 | 10 | B | C | 17 | E | 1 | 0F |
| 0 | 4 | 04 | 2 | 9 | 0B | 4 | E | 12 | 7 | 3 | 0A | 9 | 8 | 11 | B | D | 18 | E | 2 | 10 |
| 0 | 5 | 05 | 2 | A | 0C | 4 | F | 13 | 7 | 4 | 0B | 9 | 9 | 12 | B | E | 19 | E | 3 | 11 |
| 0 | 6 | 06 | 2 | B | 0D | 5 | 0 | 05 | 7 | 5 | 0C | 9 | A | 13 | B | F | 1A | E | 4 | 12 |
| 0 | 7 | 07 | 2 | C | 0E | 5 | 1 | 06 | 7 | 6 | 0D | 9 | B | 14 | C | 0 | 0C | E | 5 | 13 |
| 0 | 8 | 08 | 2 | D | 0F | 5 | 2 | 07 | 7 | 7 | 0E | 9 | C | 15 | C | 1 | 0D | E | 6 | 14 |
| 0 | 9 | 09 | 2 | E | 10 | 5 | 3 | 08 | 7 | 8 | 0F | 9 | D | 16 | C | 2 | 0E | E | 7 | 15 |
| 0 | A | 0A | 2 | F | 11 | 5 | 4 | 09 | 7 | 9 | 10 | 9 | E | 17 | C | 3 | 0F | E | 8 | 16 |
| 0 | B | 0B | 3 | 0 | 03 | 5 | 5 | 0A | 7 | A | 11 | 9 | F | 18 | C | 4 | 10 | E | 9 | 17 |
| 0 | C | 0C | 3 | 1 | 04 | 5 | 6 | 0B | 7 | B | 12 | A | 0 | 0A | C | 5 | 11 | E | A | 18 |
| 0 | D | 0D | 3 | 2 | 05 | 5 | 7 | 0C | 7 | C | 13 | A | 1 | 0B | C | 6 | 12 | E | B | 19 |
| 0 | E | 0E | 3 | 3 | 06 | 5 | 8 | 0D | 7 | D | 14 | A | 2 | 0C | C | 7 | 13 | E | C | 1A |
| 0 | F | 0F | 3 | 4 | 07 | 5 | 9 | 0E | 7 | E | 15 | A | 3 | 0D | C | 8 | 14 | E | D | 1B |
| 1 | 0 | 01 | 3 | 5 | 08 | 5 | A | 0F | 7 | F | 16 | A | 4 | 0E | C | 9 | 15 | E | E | 1C |
| 1 | 1 | 02 | 3 | 6 | 09 | 5 | B | 10 | 8 | 0 | 08 | A | 5 | 0F | C | A | 16 | E | F | 1D |
| 1 | 2 | 03 | 3 | 7 | 0A | 5 | C | 11 | 8 | 1 | 09 | A | 6 | 10 | C | B | 17 | F | 0 | 0F |
| 1 | 3 | 04 | 3 | 8 | 0B | 5 | D | 12 | 8 | 2 | 0A | A | 7 | 11 | C | C | 18 | F | 1 | 10 |
| 1 | 4 | 05 | 3 | 9 | 0C | 5 | E | 13 | 8 | 3 | 0B | A | 8 | 12 | C | D | 19 | F | 2 | 11 |
| 1 | 5 | 06 | 3 | A | 0D | 5 | F | 14 | 8 | 4 | 0C | A | 9 | 13 | C | E | 1A | F | 3 | 12 |
| 1 | 6 | 07 | 3 | B | 0E | 6 | 0 | 06 | 8 | 5 | 0D | A | A | 14 | C | F | 1B | F | 4 | 13 |
| 1 | 7 | 08 | 3 | C | 0F | 6 | 1 | 07 | 8 | 6 | 0E | A | B | 15 | D | 0 | 0D | F | 5 | 14 |
| 1 | 8 | 09 | 3 | D | 10 | 6 | 2 | 08 | 8 | 7 | 0F | A | C | 16 | D | 1 | 0E | F | 6 | 15 |
| 1 | 9 | 0A | 3 | E | 11 | 6 | 3 | 09 | 8 | 8 | 10 | A | D | 17 | D | 2 | 0F | F | 7 | 16 |
| 1 | A | 0B | 3 | F | 12 | 6 | 4 | 0A | 8 | 9 | 11 | A | E | 18 | D | 3 | 10 | F | 8 | 17 |
| 1 | B | 0C | 4 | 0 | 04 | 6 | 5 | 0B | 8 | A | 12 | A | F | 19 | D | 4 | 11 | F | 9 | 18 |
| 1 | C | 0D | 4 | 1 | 05 | 6 | 6 | 0C | 8 | B | 13 | B | 0 | 0B | D | 5 | 12 | F | A | 19 |
| 1 | D | 0E. | 4 | 2 | 06 | 6 | 7 | 0D | 8 | C | 14 | B | 1 | 0C | D | 6 | 13 | F | B | 1A |
| 1 | E | 0F | 4 | 3 | 07 | 6 | 8 | 0E | 8 | D | 15 | B | 2 | 0D | D | 7 | 14 | F | C | 1B |
| 1 | F | 10 | 4 | 4 | 08 | 6 | 9 | 0F | 8 | E | 16 | B | 3 | 0E | D | 8 | 15 | F | D | 1C |
| 2 | 0 | 02 | 4 | 5 | 09 | 6 | A | 10 | 8 | F | 17 | B | 4 | 0F | D | 9 | 16 | F | E | 1D |
| 2 | 1 | 03 | 4 | 6 | 0A | 6 | B | 11 | 9 | 0 | 09 | B | 5 | 10 | D | A | 17 | F | F | 1E |
| 2 | 2 | 04 | 4 | 7 | 0B | 6 | C | 12 | 9 | 1 | 0A | B | 6 | 11 | D | B | 18 | | | |
| 2 | 3 | 05 | 4 | 8 | 0C | 6 | D | 13 | 9 | 2 | 0B | B | 7 | 12 | D | C | 19 | | | |
| 2 | 4 | 06 | 4 | 9 | 0D | 6 | E | 14 | 9 | 3 | 0C | B | 8 | 13 | D | D | 1A | | | |

TABLE 5

| Residue | Exponent | Residue | Exponent | Residue | Exponent | Residue | Exponent |
|---|---|---|---|---|---|---|---|
| 1 | 100 | 26 | 67 | 51 | 99 | 76 | 98 |
| 2 | 1 | 27 | 7 | 52 | 68 | 77 | 22 |
| 3 | 69 | 28 | 11 | 53 | 23 | 78 | 36 |
| 4 | 2 | 29 | 91 | 54 | 8 | 79 | 64 |
| 5 | 24 | 30 | 94 | 55 | 37 | 80 | 28 |
| 6 | 70 | 31 | 84 | 56 | 12 | 81 | 76 |
| 7 | 9 | 32 | 5 | 57 | 65 | 82 | 46 |
| 8 | 3 | 33 | 82 | 58 | 92 | 83 | 89 |
| 9 | 38 | 34 | 31 | 59 | 29 | 84 | 80 |
| 10 | 25 | 35 | 33 | 60 | 95 | 85 | 54 |
| 11 | 13 | 36 | 40 | 61 | 77 | 86 | 43 |
| 12 | 71 | 37 | 56 | 62 | 85 | 87 | 60 |
| 13 | 66 | 38 | 97 | 63 | 47 | 88 | 16 |
| 14 | 10 | 39 | 35 | 64 | 6 | 89 | 21 |
| 15 | 93 | 40 | 27 | 65 | 90 | 90 | 63 |
| 16 | 4 | 41 | 45 | 66 | 83 | 91 | 75 |
| 17 | 30 | 42 | 79 | 67 | 81 | 92 | 88 |
| 18 | 39 | 43 | 42 | 68 | 32 | 93 | 53 |
| 19 | 96 | 44 | 15 | 69 | 55 | 94 | 59 |
| 20 | 26 | 45 | 62 | 70 | 34 | 95 | 20 |
| 21 | 78 | 46 | 87 | 71 | 44 | 96 | 74 |
| 22 | 14 | 47 | 58 | 72 | 41 | 97 | 52 |
| 23 | 86 | 48 | 73 | 73 | 61 | 98 | 19 |
| 24 | 72 | 49 | 18 | 74 | 57 | 99 | 51 |
| 25 | 48 | 50 | 49 | 75 | 17 | 100 | 50 |

TABLE 6

| Exponent | Residue | Exponent | Residue | Exponent | Residue | Exponent | Residue |
|---|---|---|---|---|---|---|---|
| 1 | 2 | 26 | 20 | 51 | 99 | 76 | 81 |
| 2 | 4 | 27 | 40 | 52 | 97 | 77 | 61 |
| 3 | 8 | 28 | 80 | 53 | 93 | 78 | 21 |
| 4 | 16 | 29 | 59 | 54 | 85 | 79 | 42 |
| 5 | 32 | 30 | 17 | 55 | 69 | 80 | 84 |
| 6 | 64 | 31 | 34 | 56 | 37 | 81 | 67 |
| 7 | 27 | 32 | 68 | 57 | 74 | 82 | 33 |
| 8 | 54 | 33 | 35 | 58 | 47 | 83 | 66 |
| 9 | 7 | 34 | 70 | 59 | 94 | 84 | 31 |
| 10 | 14 | 35 | 39 | 60 | 87 | 85 | 62 |
| 11 | 28 | 36 | 78 | 61 | 73 | 86 | 23 |
| 12 | 56 | 37 | 55 | 62 | 45 | 87 | 46 |
| 13 | 11 | 38 | 9 | 63 | 90 | 88 | 92 |
| 14 | 22 | 39 | 18 | 64 | 79 | 89 | 83 |
| 15 | 44 | 40 | 36 | 65 | 57 | 90 | 65 |
| 16 | 88 | 41 | 72 | 66 | 13 | 91 | 29 |
| 17 | 75 | 42 | 43 | 67 | 26 | 92 | 58 |
| 18 | 49 | 43 | 86 | 68 | 52 | 93 | 15 |
| 19 | 98 | 44 | 71 | 69 | 3 | 94 | 30 |
| 20 | 95 | 45 | 41 | 70 | 6 | 95 | 60 |
| 21 | 89 | 46 | 82 | 71 | 12 | 96 | 19 |
| 22 | 77 | 47 | 63 | 72 | 24 | 97 | 38 |
| 23 | 53 | 48 | 25 | 73 | 48 | 98 | 76 |
| 24 | 5 | 49 | 50 | 74 | 96 | 99 | 51 |
| 25 | 10 | 50 | 100 | 75 | 91 | 100 | 1 |

What is claimed is:

1. An asynchronous multiplier comprising:
first means for calculating a first residue which is congruent with a result of a multiplication of a first and a second positive integer with respect to a first modulus which is equal to a prime number, both said first and said second positive integers being represented by an even number of digits;
second means for calculating a first, a second, and a third product by multiplying (a) a lower half of the digits of said first positive integer by a lower half of the digits of said second positive integer, (b) the lower half of the digits of said first positive integer by the digits of a higher half of the second positive integer digits and (c) a higher half of the digits of said first positive integer by the lower half of the digits of said second positive integer, respectively;
first combining means for combining said first through said third products into a second residue which is congruent with the result of the multiplication with respect to a second modulus which is equal to said prime number less one; and
second combining means for combining said first and said second residues into said result of said multiplication.

2. The multiplier of claim 1 and means for giving a signal representative of each of said first and said second positive integers, said signal indicating said positive integers in terms of an optional numbering system.

3. A calculating system for calculating a result of a multiplication of a first and a second positive integer, each of said first and said second integers being related to a predetermined radix by a predetermined even number h of digits, said even number h being such that an h-th power of said radix plus one is a prime number, the calculation being carried out by a use of a first and a second residue, said first residue being congruent to said result of said multiplication with respect to a first modulus which is equal to said prime number less one, said second residue being congruent to said result of said multiplication with respect to a second modulus which is equal to said prime number, said result of said multiplication and each of said first and said second residues being related to said radix by 2h and h digits, respectively, said calculating system comprising:
means including a subsystem for processing said first and said second positive integers into said second residue by a use of a fact known in the number theory in which consecutive integers are said prime number less one and are congruent to powers of a preselected primitive root of said prime number with respect to said second modulus, when exponents for the respective powers are given by consecutive whole numbers of said prime number less one;
partial product calculating means for calculating a first, a second, and a third h-digit partial product by multiplying (a) a lower half of the digits of said first positive integer by a lower half of the digits of said second positive integer, (b) the lower half of the digits of said first positive integer by the digits of a higher half of the second positive integer digits, and (c) a higher half of the digits of said first positive integer by the lower half of the digits of said second positive integer, respectively;
first combining means for combining said first through said third h-digit partial products into said first residue; and
second combining means for combining said first and said second residues into said result of said multiplication.

4. The system of claim 3, wherein said subsystem means comprises:
first transforming means for transforming said consecutive integers into said whole numbers;
second transforming means for inversely transforming said whole numbers into said consecutive integers;
means responsive to said first and said second positive integers for controlling said first transforming means to provide a first and a second of said whole numbers, respectively;
means responsive to said first and said second whole numbers for calculating a sum residue which is congruent to a sum of said first and said second whole numbers with respect to first modulus; and means responsive to one of said whole numbers for controlling said second transforming means to provide one of said consecutive integers, said one whole number being equal to said calculated sum residue, the provided one of said consecutive integers giving said second residue.

5. The system of claim 3 or 4, wherein said second combining means comprises:

processing means connected to said means including said subsystem and said first combining means for processing said first and said second residues into an h-digit processed result; and means connected to said processing means and said first combining means for concatenating said processed result and said first residue as higher and lower h digits of said result of said multiplication, respectively.

6. The system of claim 5, wherein said radix is "2" and the predetermined even number h is a predetermined one of the integers of "4", "8", and "16".

7. The system of claim 6, wherein:

said partial product calculating means comprises:

first partial product calculating means for multiplying the lower half of the first positive integer digits by the lower half of the second positive integer digits to separately provide a higher and a lower half of the digits of said first h-digit partial product;

second partial product calculating means for multiplying the lower half of the first positive integer digits by the higher half of the second positive integer digits to separately provide a higher and a lower half of the digits of said second h-digit partial product;

third partial product calculating means for multiplying the higher half of the first positive integer digits by the lower half of the second positive integer digits to separately provide a higher and a lower half of the digits of said third h-digit partial product;

said first combining merans comprising:

summing means for summing the higher half of the first h-digit partial product digits, the lower half of the second h-digit partial product digits, and the lower half of the third h-digit partial product digits into an (h/2)-digit sum; and means for concatenating the lower half of the first h-digit partial product digits and said (h/2)-digit sum as higher and lower h/2 digits of said first residue, respectively.

8. The system of claim 5, wherein said radix is "10" and said predetermined even number is "2".

* * * * *